(12) United States Patent
Lee

(10) Patent No.: US 6,433,948 B1
(45) Date of Patent: Aug. 13, 2002

(54) PROCESS MANAGEMENT METHOD USING SERVO TRACK WRITER

(75) Inventor: Jae-Sung Lee, Seoul (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/249,305

(22) Filed: Feb. 12, 1999

(30) Foreign Application Priority Data

Feb. 20, 1998 (KR) ................................................ 98/5444

(51) Int. Cl.[7] ................................................ G11B 21/02
(52) U.S. Cl. ................................ 360/75; 360/48; 360/69; 369/59.25; 369/53.2; 369/52.1
(58) Field of Search .......................... 360/75, 55, 69, 360/135, 77.05, 60, 48; 369/59.25, 53.2, 52.1

(56) References Cited

U.S. PATENT DOCUMENTS

| | | | | |
|---|---|---|---|---|
| 3,974,524 A | | 8/1976 | Griffiths et al. ................ 360/75 |
| 4,578,722 A | * | 3/1986 | Lovgren et al. ................ 360/60 |
| 4,669,004 A | | 5/1987 | Moon et al. .................... 360/53 |
| 4,823,210 A | * | 4/1989 | Bond .............................. 360/60 |
| 4,831,470 A | | 5/1989 | Brunnett et al. ................ 360/75 |
| 5,500,848 A | | 3/1996 | Best et al. .................. 369/275.3 |
| 5,642,943 A | | 7/1997 | Szeremta ..................... 384/100 |
| 5,675,446 A | * | 10/1997 | Kosugi et al. ................ 360/27 |
| 5,774,294 A | | 6/1998 | Fioravanti ..................... 360/75 |
| 5,796,542 A | | 8/1998 | Szeremta .................. 360/77.02 |
| 5,917,669 A | * | 6/1999 | Johnson et al. ................ 360/53 |
| 6,058,335 A | * | 5/2000 | Kim ............................ 700/108 |
| 6,108,156 A | * | 8/2000 | Lee et al. ..................... 360/75 |
| 6,118,632 A | * | 9/2000 | Albrecht et al. ............. 360/135 |

* cited by examiner

Primary Examiner—David Hudspeth
Assistant Examiner—Dan I. Davidson
(74) Attorney, Agent, or Firm—Robert E. Bushnell, Esq.

(57) ABSTRACT

A method of managing a manufacturing process of a hard disk drive having a disk as a recording medium. The disk is divided into a data band for writing user data and a plurality of protection bands. In the method, a serial number of the hard disk drive is read, the serial number is written in at least one of the bands during servo track writing, and the written serial number is read for use in the manufacturing process.

58 Claims, 6 Drawing Sheets

FIG. 3A SERVO SECTOR | DATA SECTOR | SERVO SECTOR | DATA SECTOR | SERVO SECTOR

FIG. 3B AGC | SYNC | SAM | IDX | GRAY CODE | SERVO BURSTS (A, B, C, D) | PAD

FIG. 3C AGC | SYNC | SAM | IDX | SERVO SECTOR NO. / HEADER NO. / CYLINDER NO. | SERVO BURSTS (A, B, C, D) | PAD

PROCESS MANAGEMENT METHOD USING SERVO TRACK WRITER

CLAIM OF PRIORITY

This application makes reference to, incorporates the same herein, and claims all benefits accruing under 35 U.S.C. §119 from an application entitled *Process Management Method Using Servo Track Writer* earlier filed in the Korean Industrial Property Office on the $20^{th}$ day of February 1998, and there duly assigned Ser. No. 5444/1998, a copy of which is annexed hereto.

BACKGROUND OF THE INVENTION

1. Technical Field

The present invention relates to servo track writing in a magnetic storage device, and in particular, to an efficient process management method using a servo track writer.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer such as a notebook computer or palm-sized computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

The hard disk storage device can also be referred to as a hard disk drive (HDD) containing a hard disk, wherein the hard disk is the actual storage medium. A platter is another term for a hard disk. The hard disk drive is an auxiliary memory unit of the computer system. The hard disk drive contains components enabling data to be received from the associated computer system and then written to the hard disk, and also enabling data to be read from the hard disk and then transmitted to the associated computer system. The hard disk drive includes a magnetic read/write head which flies above the surface of the hard disk while the hard disk is rotating.

The hard disk has a plurality of concentric tracks for storing data. Each track has a plurality of sectors. Some hard disk drives contain several hard disks, each hard disk being horizontally mounted on one shared vertical spindle-axis, so that the hard disks form a stack of hard disks. When a disk drive has a plurality of hard disks, with each disk having its own read/write head, every read/write head is aligned on a separate track of its associated hard disk. A head actuator locks all the heads together so that all heads are at the same position from the center of the disk along a given radius. The vertical stack of tracks formed by such an arrangement is referred to as a cylinder. The number of cylinders in a hard disk drive is the same as the number of tracks on a hard disk of that hard disk drive.

A primary function of the hard disk drive is to receive data from the associated computer system, write the data onto the hard disk without loss of the data, and then read and transmit the data to the computer system when necessary. Therefore, a manufacturer of the hard disk drive not only makes an effort to maximize data recording capacity, but also looks for various means to prevent data loss when writing and reading the data.

A magnetic storage device, such as a hard disk drive (HDD) or a floppy disk drive. is widely used as an auxiliary memory for a computer system. Especially, the hard disk drive offers the benefits of rapid access to data as well as stable storage of a large amount of data.

In such magnetic storage devices, it is necessary that servo information be originally recorded, generally during a phase of factory check out, before the system can be operational. This is true because the servo information is relied upon for normal track seeking (counting), track following, and head velocity determination. The servo information is originally recorded on the magnetic storage device using a servo track writer (STW).

All disk drives require some means of determining the radial position of the read-write head over the disk so that the head can be accurately positioned over any desired track. Typically this is accomplished by placing servo information on one or more of the disk surfaces for reading by magnetic or optical heads. Some disk drives are known as sector servo drives and store servo information interspersed with the data on each disk surface.

I have found that a hard disk drive manufacturing process can be inefficient and unnecessarily expensive. Efforts have been made to develop improvements pertaining to servo-related issues and magnetic storage devices such as hard disk drives.

Exemplars of recent efforts in the art include U.S. Pat. No. 5,774,294 for a *Servo Track Writer with Tuned Damper* issued to Fioravanti, U.S. Pat. No. 5,796,542 for a *Servo-Track Writer System Having a Plurality of Engaging Pins Co-Axially Rotated with Head Actuator Pivot Axes* issued to Szeremeta, U.S. Pat. No. 5,500,848 for a *Sector Servo Data Recording Disk Having Data Regions Without Identification (ID), Fields* issued to Best et al., U.S. Pat. No. 3,974,524 for a *Magnetic Storage Apparatus Employing Flexible Record Disks with Peripheral Disk-Identification Means* issued to Griffiths et al., U.S. Pat. No. 4,669,004 for a *High Capacity Disk File with Embedded Sector Servo* issued to Moon et al., U.S. Pat. No. 5,642,943 for a *Self-aligning Air Bearing for Use with Servo-Track Writer* issued to Szeremeta, and U.S. Pat. No. 4,831,470 for a *Method and Apparatus for Recording Disk Servo Information with Detachable Position Decoder* issued to Brunnett et al.

While these recent efforts provide advantages, I note that they fail to adequately provide a process management method using a servo track writer for efficiently and conveniently managing a hard disk drive manufacturing process and reducing manufacturing costs.

SUMMARY OF THE INVENTION

An object of the present invention is therefore to provide a process management method using a servo track writer, in which a serial drive number is written on a disk to efficiently manage a hard disk drive manufacturing process.

A further object of the present invention is to provide a process management method using a servo track writer, in which a serial drive number is written on a disk to efficiently manage a hard disk drive manufacturing process and reduce manufacture cost.

To achieve the above objects and others, there is provided a method of managing a manufacturing process of a hard disk drive having a disk as a recording medium. The disk is divided into a data band for writing user data and a plurality of protection bands. In the method, a serial number of the hard disk drive is read, the serial number is written at least in one of the bands during servo track writing, and the written serial number is read for use in the manufacturing process.

To achieve these and other objects in accordance with the principles of the present invention, as embodied and broadly described, the present invention provides a method, comprising: reading identification data from a first location, said identification data identifying a storage unit; writing encoded data corresponding to said identification data to a second location separately located from said first location, said second location being on said storage unit; and reading said encoded data from said second location on said storage unit.

To achieve these and other objects in accordance with the principles of the present invention, as embodied and broadly described, the present invention provides an apparatus, comprising: a disk storing user data and encoded data; a first reading unit reading identification data identifying said disk; a writing unit writing said encoded data to said disk, said encoded data corresponding to said identification data; and a second reading unit reading said encoded data from said disk.

To achieve these and other objects in accordance with the principles of the present invention, as embodied and broadly described, the present invention provides a method of managing a manufacturing process of a hard disk drive having a disk as a recording medium divided into a data region storing user data and a plurality of protection regions, comprising: reading a serial number of a hard disk drive, said hard disk drive having a plurality of subparts including a disk, said disk being divided into a data region storing user data and a plurality of protection regions; writing said serial number to at least one of said regions, said writing of said serial number being performed during a servo track writing; and reading said serial number from said at least one of said regions during a manufacturing process.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIGS. 3A, 3B, and 3C are views illustrating sector formats of tracks concentrically arranged on a data band of a disk;

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
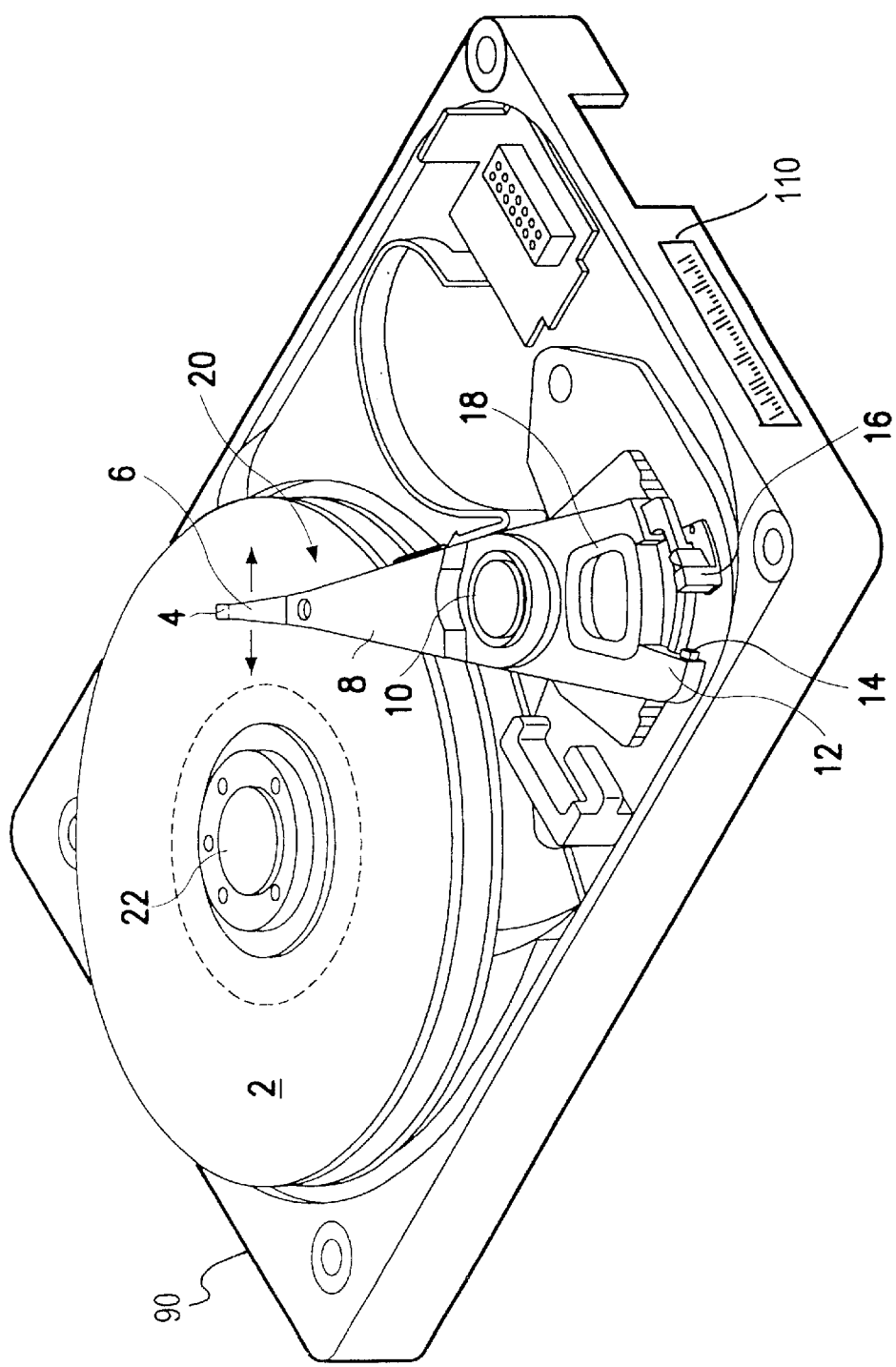
FIG. 1 is a perspective view of a hard disk drive.

Turn now to FIG. 1, which shows a perspective view of a hard disk drive 90, which is a type of magnetic storage device. As shown in FIG. 1, the hard disk drive 90 is comprised of a disk 2 rapidly rotated by a spindle motor 22 and an actuator arm 20 having a magnetic head (hereinafter referred to as a head) 4 fixed thereto in order to write or read data on or from tracks of the disk 2. The actuator and 20 is installed rotatably around a pivot shaft 10 and has a bobbin 12 and a coil at an end thereof and a suspension 6 at the other end thereof. The head 4 is affixed to a distal end of the suspension 6. The mechanism of writing or reading data on or from a track of the disk 2 is performed by moving the bobbin 12 and the coil by driving a voice coil motor (VCM) 18 and thus moving the head 4 between the innermost and outermost circumferences of the disk 2. The head 4 moves at a very low flying height due to an air flow generated from the rapidly rotating disk 2.

A bar code reader can be used to read information from a label 110 affixed to the hard disk drive 90. For example, a bar code label 110 of the hard disk drive 90 can be read using a bar code reader. The bar code label 110 can include a serial number of the hard disk drive 90.

The bar code label 110 shown in FIG. 1 is merely one example of a location where a serial number of a hard disk drive 90 can be positioned. A serial number could be stamped into a housing of the hard disk drive 90. Or a serial number could be positioned in another place or could appear in a variety of different forms, other than the bar code label 110 shown in FIG. 1.

Figure 2:
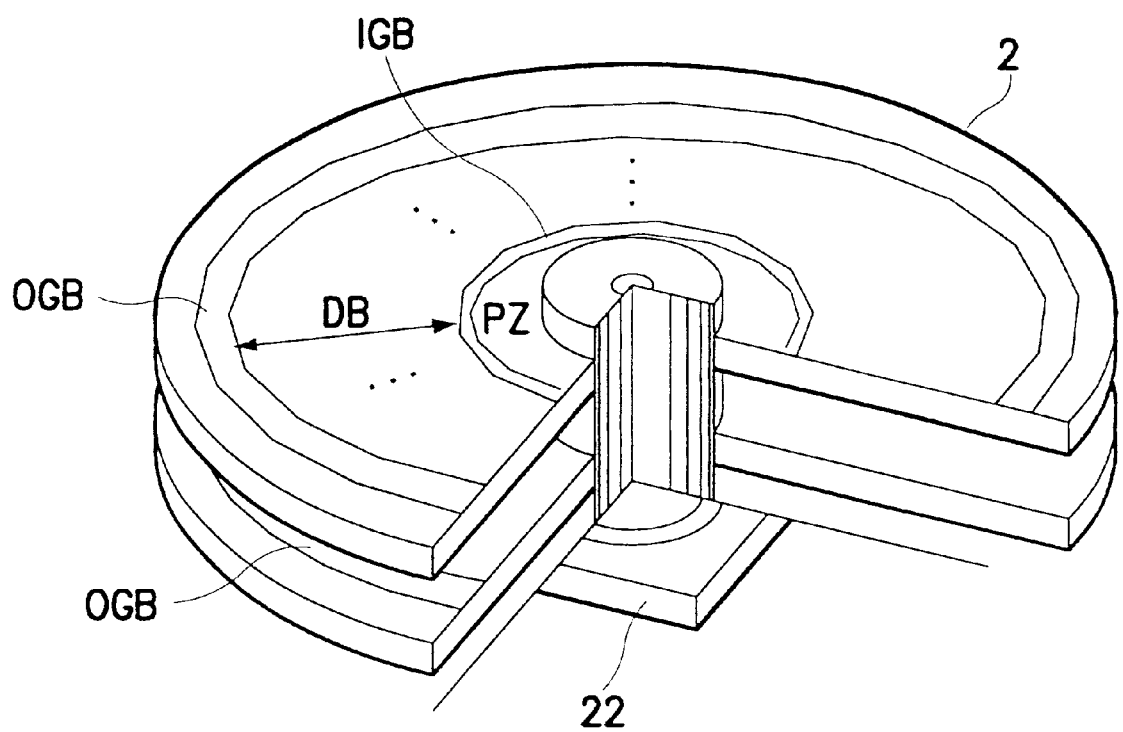
FIG. 2 is a perspective view of disks stacked around a spindle motor shaft, each disk having bands defined thereon.

Turn now to FIG. 2, which shows a perspective view of disks stacked around a spindle motor shaft, each disk having bands defined thereon. FIG. 2 is a perspective view of a disk assembly mounted upon a spindle motor shaft, each disk 2 being divided into bands. On the disk 2 are defined a parking zone (PZ) where the head 4 is placed when the drive is inoperative (power-off), a data band (DB) for recoding actual data, an outer guard band (OGB), and an inner guard band (IGB). Write and read of data on and from the data band requires servo control by which the head 4 moves to a target track and follows the center line of the target track within a predetermined range. Prior to the servo control, servo information should be written on the disk 2 generally by a servo track writer (STW) in the process of manufacturing a hard disk drive. Now, there will be given a description of servo information written on the disk 2 by the servo track writer, with reference to FIGS. 3A, 3B, and 3C.

Turn now to FIGS. 3A, 3B, and 3C, which show views illustrating sector formats of tracks concentrically arranged on a data band of a disk. FIGS. 3A, 3B, and 3C are views illustrating sector formats of tracks concentrically arranged in the data band of the disk 2. Referring to FIG. 3A, a servo sector and a data sector alternate on a track. The data sector is divided into an identification section and a data section. This identification section is absent in a headerless format. This identification section is for providing identification information. This data section is for writing user data. The servo sector, as shown in FIG. 3B, includes automatic gain control (AGC) for maintaining time required to change a data write mode to a servo information read mode and the magnitude of a position signal read from the head 4 uniform across the disk, SYNC providing synchronization for detection of a servo signal, servo address mark (SAM) written as a reference signal for generating various servo timings, index (IDX) providing information on one rotation of a disk, Gray Code, servo bursts A, B, C, and D for controlling the on-track position of a head, and a pad. The Gray Code has address information inclusive of a servo sector number, a header number, and a cylinder number, as shown in FIG. 3C.

As described above, information on a hard disk drive (HDD) manufacturing process is absent in the servo sector. For example, the servo sector does not provide a serial drive number or main part-related information on a head vendor, a disk vendor, a spindle motor vendor or the like. In particular, the drive serial number is identified by reading out bar code information 110 (FIG. 1) attached to the hard disk drive 90 (FIG. 1) with an additionally procured bar code reader 100 (FIG. 4) so as to manage processes like a head function test, a burn-in test, and a final test.

Figure 4:
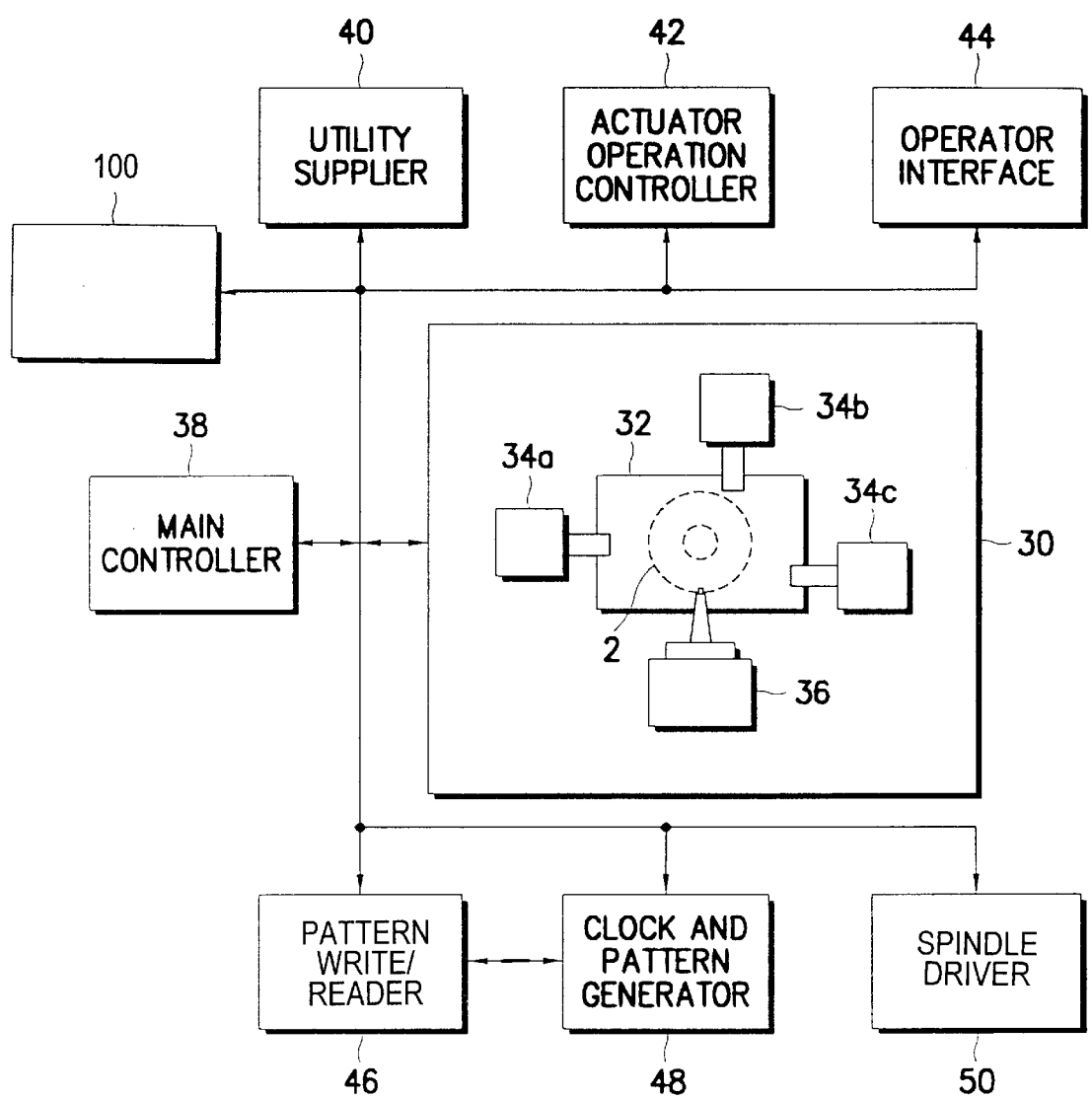
FIG. 4 is a block diagram of a servo track writer for writing servo information on a disk, in accordance with the principles of the present invention.

Turn now to FIG. 4, which shows a block diagram of a servo track writer (STW) for writing servo information on a disk, in accordance with the principles of the present invention. FIG. 4 is a block diagram of a servo track writer for writing servo information on the disk 2, to which the present invention is provided. Referring to FIG. 4, a fixture unit 30 includes clamps 34a, 34b, and 34c for clamping a head disk assembly (HDA) 32 and a clock head portion 36 for writing a servo reference clock signal on the disk 2 by a clock head. The servo reference clock signal is written in a predetermined area of the disk 2, usually outside the outermost servo track so as to set a reference position for writing servo information on the disk 2. The servo track refers to a track written on the disk 2 by the servo track writer (STW). Meanwhile, the clock head is loaded in the servo reference clock position through a hole formed on a sidewall of the hard disk drive. The hole is sealed by a label in a normal state. A main controller 38 controls the overall units of the servo track writer. A utility supplier 40 supplies an operating power supply voltage to the servo track writer and necessary air to the head disk assembly 32. An actuator operation controller 42 controls the movement of an actuator. An operator interface 44 provides an interface between an operator terminal and the main controller 38 to allow a user to control the operation of the servo track writer or notify the user of the servo track writer operation. A pattern writer/reader 46 writes or reads a servo pattern on or from the disk 2 by a head under the control of the main controller 38. A clock and pattern generator 48 generates the servo reference clock signal and the servo pattern under the control of the main controller 38. A spindle driver 50 drives a spindle motor 22 (shown in FIG. 1) under the control of the main controller 38.

According to the features of the present invention, a bar code reader 100 is further provided to the servo track writer in order to read a bar code, that is, a serial number attached on the drive. The bar code reader 100 is in communication with the main controller 38.

The servo track writer including the bar code reader 100, as shown in FIG. 4, comprises merely one embodiment of the present invention. A second embodiment of the servo track writer, according to the principles of the present invention, does not include a bar code reader. For example, in the aforementioned second embodiment of the servo track writer a user could manually enter the serial number of the drive into the servo track writer using a keypad on the operator interface 44, in lieu of using a bar code reader. In other words, in the aforementioned second embodiment, no bar code reader would be in communication with the main controller 38.

Figure 5A:
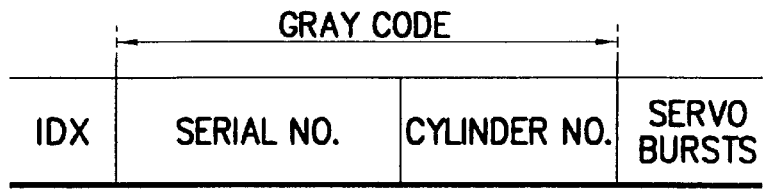
FIGS. 5A, 5B, and 5C are views illustrating a detailed format of a specific Gray Code having a serial drive number in an outer guard band or inner guard band and sector formats, in accordance with the principles of the present invention.
Figure 5B:
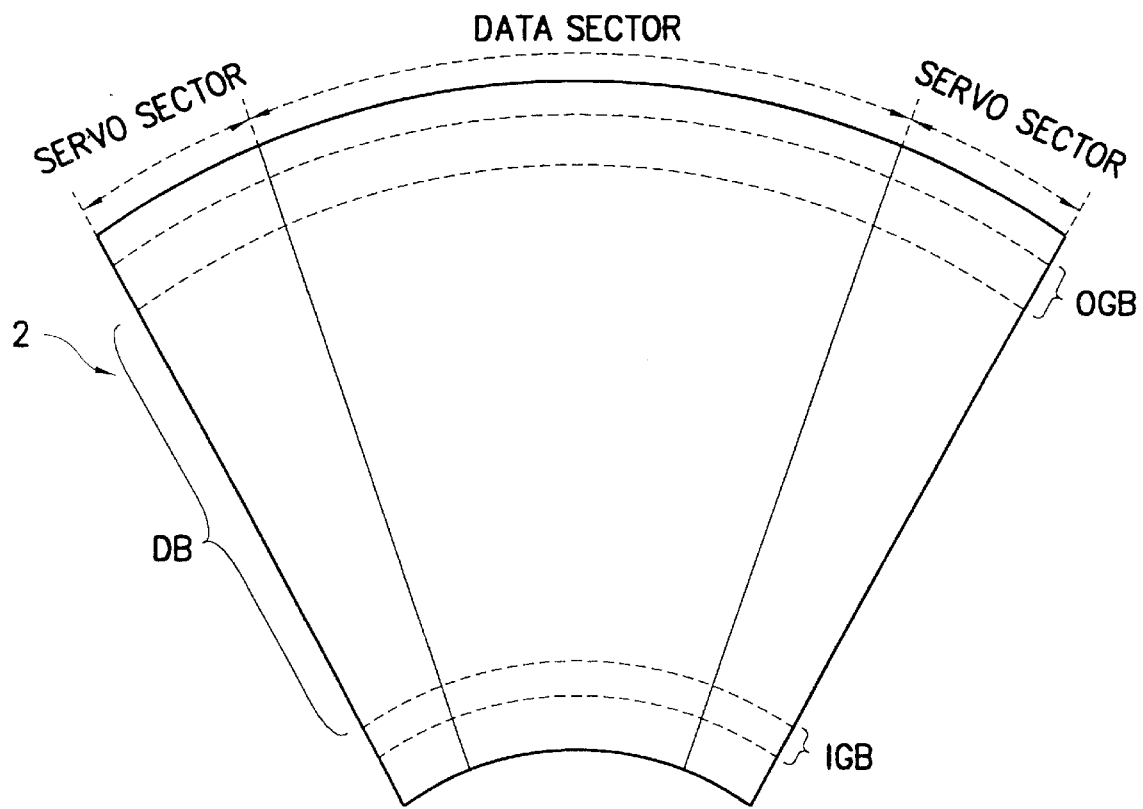
Figure 5C:
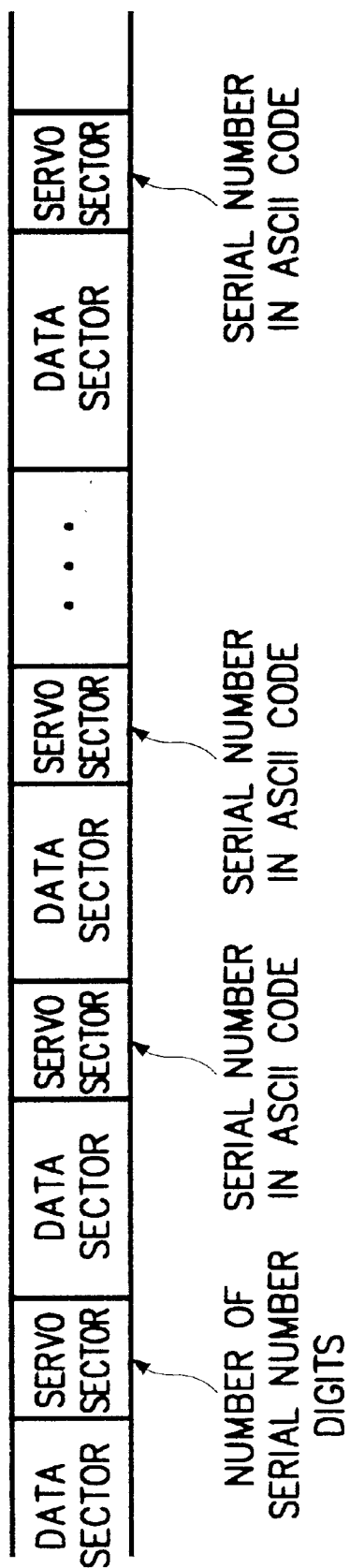

Turn now to FIGS. 5A, 5B, and 5C, which show views illustrating a detailed format of a specific Gray Code having a serial drive number in an outer guard band or inner guard band and sector formats, in accordance with the principles of the present invention. FIGS. 5A, 5B, and 5C are views illustrating track formats, referred to for describing a Gray Code having a serial drive number written therein in an outer guard band or inner guard band according to the embodiment of the present invention. Serial drive number writing according to the embodiment of the present invention will be described as follows, referring to FIGS. 5A, 5B, and 5C.

After servo track writing on the disk 2 by the servo track writer of FIG. 4, the disk 2 is largely divided into three bands referred to as an outer guard band (OGB), a data band (DB), and an inner guard band (IGB). The three bands are shown in FIGS. 2 and 5B. Only the data band (DB) has user data and the other two bands, outer guard band and inner guard band, are reserved against heat-induced drive deformation, part tolerance, and head overshoot during track seek. The serial drive number can be written in any of the bands during the servo track writing. In case the serial drive number is written in a data sector of the data band, it should be re-written in a maintenance cylinder before a data write operation of a burn-in test because it is likely to be erased during the data write operation.

Therefore, the serial drive number is written in Gray Code of a servo sector in the outer guard band or inner guard band according to the embodiment of the present invention, as shown in FIG. 5A. The Gray Code includes only the serial drive number and a cylinder number. Though a sector number, a header number, and a cylinder number are written in Gray Code, there is no requirement of the sector number and the header number in Gray Code of the outer guard band and inner guard band because these are not used for writing user data. Hence, the serial drive number is preferably written in the Gray Code of a servo sector in the outer guard band or inner guard band. Because the serial drive number has little to do with drive operation, writing the serial drive number in a servo sector of the data band is not preferable but possible as another embodiment of the present invention.

An area assigned to the serial,drive number in the Gray Code of a servo sector may be too small. In this case, the serial drive number can separately be written in the serial number areas of different servo sectors, as shown in FIG. 5C. In FIG. 5C, by way of example, the total number of digits of the serial number is written in a first servo sector to indicate how many servo sectors are taken to write the serial drive number. Then, the serial drive number is written in ASCII code from the following second sector on. Further, the serial drive number may be written repeatedly in the same track or in a different header against potential damage to the serial number caused by defects in a servo sector.

The serial drive number in the Gray Code is accessed at a vendor unique command and decoded for use as process automation information in a hard disk drive manufacturing process. In the case of a serial drive number written in Gray Code of a servo sector in an outer guard band or inner guard band, it can be accessed at the vendor unique command when necessary and the initially accessed serial number may be re-written in a maintenance cylinder.

While the serial drive number is written in a predetermined area of a servo sector to be used in process management according to the above specific embodiment of the present invention, servo track writing time may also be added. In addition, additional part-related information such as a head vendor, disk vendor, and spindle vendor can be written in the same manner.

In addition, identification information other than a serial number can be used in conjunction with the present invention, to replace the serial number. Also, identification information of individual subparts of a hard disk drive 90 (FIG. 1), such as the spindle motor 22 (FIG. 1), can be used in conjunction with the present invention. For example, a date of manufacture along with a model number of the spindle motor 22 can be written to the disk 2 using the servo track writer (STW) shown in FIG. 4, in accordance with the principles of the present invention.

As described above, the present invention has the advantages of efficient process management and reduced manufacture cost because a serial drive number is written in at least one of bands of a disk and read for use in a manufacturing process.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
    reading identification data from at least one location on a storage unit, said at least one location being spaced apart from all storage disks of said storage unit, each of the disks having a data band for user data and having at least one guard band not for user data, said identification data identifying at least one portion of said storage unit, said identification data not being in a magnetic form;
    writing first encoded data to at least one of the bands during servo track writing, said first encoded data including at least a part of said read identification data, said first encoded data being in a magnetic form; and
    reading said first encoded data from said at least one of the bands.

2. The method of claim 1, further comprising outputting information to an operator interface in response to said reading of said first encoded data, said information corresponding to said read first encoded data.

3. The method of claim 1, further comprising placing said identification data at said at least one location on said storage unit.

4. The method of claim 3, said placing corresponding to placing a label at said at least one location on said storage unit, said identification data being located on said label.

5. The method of claim 4, the at least one guard band including an inner guard band and an outer guard band, said writing corresponding to writing said first encoded data to at least one servo sector in one of the guard bands.

6. The method of claim 5, said identification data corresponding to at least one selected from among information identifying said storage unit, information identifying a vendor of said storage unit, information identifying a vendor of a head of said storage unit, information identifying a vendor of a disk of said storage unit, information identifying a vendor of a spindle motor of said storage unit, information identifying said head, information identifying said disk, and information identifying said spindle motor.

7. The method of claim 3, said at least one location on said storage unit being on an exterior body of said storage unit.

8. The method of claim 1, said reading of said identification data from said at least one location being performed by a bar code reader, said identification data being in a form of a bar code.

9. The method of claim 1, said reading of said identification data from said at least one location being performed by a user observing said identification data, the user being not aided by any instrument.

10. The method of claim 9, said writing of said first encoded data being performed in response to the user manually entering said observed identification data into an operator interface.

11. The method of claim 1, said writing corresponding to writing said first encoded data to the at least one guard band.

12. The method of claim 11, said identification data uniquely identifying said at least one portion of said storage unit.

13. The method of claim 11, said identification data corresponding to at least one selected from among information identifying said storage unit, information identifying a vendor of said storage unit, information identifying a vendor of a head of said storage unit, information identifying a vendor of a disk of said storage unit, information identifying a vendor of a spindle motor of said storage unit, information identifying said head, information identifying said disk, and information identifying said spindle motor.

14. The method of claim 11, said reading of said first encoded data being for use in a manufacturing process.

15. The method of claim 11, said storage unit corresponding to a hard disk drive unit.

16. The method of claim 11, said first encoded data including a writing time corresponding to a time when said writing of said first encoded data is performed.

17. The method of claim 11, said at least one portion of said storage unit corresponding to at least one selected from among said storage unit, a disk, a head, and a spindle motor.

18. The method of claim 1, said writing corresponding to writing said first encoded data to gray code of at least one servo sector in the at least one guard band.

19. The method of claim 1, said writing of said first encoded data to at least one of the bands corresponding to a head writing in response to control of a main controller.

20. The method of claim 19, said writing corresponding to writing said first encoded data to gray code of at least one servo sector in the at least one guard band.

21. The method of claim 20, said first encoded data including a servo track writing time corresponding to a time when said servo track writing of said first encoded data is performed.

22. The method of claim 1, further comprising:
when said writing corresponds to writing said first encoded data to a data sector in the data band, re-writing said first encoded data to a different location of said storage unit before a data write operation of a burn-in test of said storage unit.

23. The method of claim 1, said writing corresponding to writing said first encoded data to at least one servo sector.

24. The method of claim 23, said at least one servo sector including at least a first servo sector and a plurality of additional spaced apart servo sectors, a number of digits of said read identification data being written to said first servo sector, said read identification data being written to said plurality of additional spaced apart servo sectors.

25. A method, comprising:
placing identification data on a storage unit in at least one location, said at least one location being spaced apart from all storage disks of said storage unit, each of the disks having a user band for user data and having at least one guard band separately located from the user band;
reading said identification data from said at least one location on said storage unit, said identification data identifying at least one portion of said storage unit, said identification data not being in a magnetic form;
writing first encoded data to said at least one guard band, said first encoded data including at least a part of said read identification data, said first encoded data being in a magnetic form; and
reading said first encoded data from said at least one guard band.

26. The method of claim 25, further comprising outputting information to an operator interface in response to said reading of said first encoded data, said information corresponding to said read first encoded data.

27. The method of claim 25, said placing corresponding to placing a label at said at least one location on said storage unit, said identification data being located on said label.

28. The method of claim 27, said reading of said identification data from said at least one location being performed by a bar code reader, said identification data being in a form of a bar code.

29. The method of claim 27, said reading of said identification data from said at least one location being performed by a user observing said identification data, the user being not aided by any instrument.

30. The method of claim 29, said writing of said first encoded data being performed in response to the user manually entering said observed identification data into an operator interface.

31. The method of claim 25, said identification data uniquely identifying said at least one portion of said storage unit.

32. The method of claim 25, said identification data corresponding to at least one selected from among information identifying said storage unit, information identifying a vendor of said storage unit, information identifying a vendor of a head of said storage unit, information identifying a vendor of said disk of said storage unit, information identifying a vendor of a spindle motor of said storage unit, information identifying said head, information identifying said disk, and information identifying said spindle motor.

33. The method of claim 25, said writing being performed during servo track writing.

34. The method of claim 25, said writing being performed by a servo track writer writing servo information during manufacturing of said storage unit.

35. The method of claim 34, said storage unit corresponding to a hard disk drive unit.

36. The method of claim 25, said at least one guard band including an inner guard band near an inner edge of said user band, and including an outer guard band near an outer edge of said user band.

37. The method of claim 25, said at least one guard band being not for user data.

38. The method of claim 37, said first encoded data including a writing time corresponding to a time when said writing of said first encoded data is performed.

39. The method of claim 37, said at least one portion of said storage unit corresponding to at least one selected from among said storage unit, a disk, a head, and a spindle motor.

40. The method of claim 37, said writing being performed by a servo track writer writing servo information during manufacturing of said storage unit.

41. The method of claim 40, said writing of said first encoded data to said at least one guard band including writing said first encoded data to at least two servo sectors selected from among a plurality of servo sectors in said at least one guard band, said plurality of servo sectors including at least a first servo sector and a plurality of additional spaced apart servo sectors, a number of digits of said read identification data being written to said first servo sector, said read identification data being written to said plurality of additional spaced apart servo sectors.

42. An apparatus, comprising:
a storage unit having identification data placed on said storage unit in at least one location on said storage unit, said identification data identifying at least one portion of said storage unit, said identification data not being in a magnetic form, said identification data being read from said at least one location; and
a disk in said storage unit, said disk having a user band for user data and having a guard band separately located from the user band, said at least one location on said storage unit being spaced apart from said disk, said disk storing first encoded data, said first encoded data including at least said read identification data, said first encoded data being in a magnetic form, said first encoded data being written to the guard band on said disk in dependence upon said reading of said identification data from said at least one location on said storage unit.

43. The apparatus of claim 42, said writing of said first encoded data to the guard band being automatically performed in response to said reading of said identification data.

44. The apparatus of claim 42, further comprising a label, said identification data being placed on said storage unit when said label is placed on said storage unit, said identification data being located on said label.

45. The apparatus of claim 44, further comprising a bar code reader, said reading of said identification data from said at least one location being performed by said bar code reader, said identification data being in a form of a bar code.

46. The apparatus of claim 44, said identification data being read from said at least one location by a user observing said identification data, the user performing said observing without being aided by any instrument.

47. The apparatus of claim 46, said disk being connected to an operator interface, said writing of said first encoded data to the guard band on said disk being performed in response to a manual entering of said observed identification data into said operator interface.

48. The apparatus of claim 42, said identification data uniquely identifying said at least one portion of said storage unit.

49. The apparatus of claim 48, further comprising:
a head reading from and writing to said disk; and
a spindle motor rotating said disk, said identification data corresponding to at least one selected from among information identifying said storage unit, information identifying a vendor of said storage unit, information identifying a vendor of said head of said storage unit, information identifying a vendor of said disk of said storage unit, information identifying a vendor of said spindle motor of said storage unit, information identifying said head, information identifying said disk, and information identifying said spindle motor.

50. The apparatus of claim 49, said writing of said first encoded data to the guard band being performed when said head writes to said disk of said storage unit, said first encoded data being read when said head reads from said disk of said storage unit.

51. The apparatus of claim 50, further comprising a servo track writer writing servo information to said disk, said writing of said first encoded data to the guard band being performed when said servo track writer controls said head to write to said disk of said storage unit.

52. The apparatus of claim 51, the guard band being not for user data, said servo track writer performing said writing of said first encoded data to the guard band during manufacturing of said storage unit.

53. The apparatus of claim 42, the guard band being not for user data, said writing of said first encoded data to the guard band being performed by a servo track writer during manufacturing of said storage unit.

54. The apparatus of claim 53, said first encoded data including a writing time corresponding to a time when said first encoded data is written to said disk.

55. The apparatus of claim 53, said writing of said first encoded data to the guard band including writing said first encoded data to gray code of at least one servo sector selected from among a plurality of servo sectors in the guard band.

56. The apparatus of claim 55, said at least one servo sector including at least a first servo sector and a plurality of additional spaced apart servo sectors, a number of digits of said read identification data being written to said first servo sector, said read identification data being written to said plurality of additional spaced apart servo sectors.

57. The apparatus of claim 55, further comprising an operator interface being connected to said disk, information being output to said operator interface in response to a reading of said first encoded data, said information corresponding to said read first encoded data.

58. The apparatus of claim 42, said disk being connected to an operator interface, information being output to said operator interface in response to a reading of said first encoded data, said information corresponding to said read first encoded data.

* * * * *